United States Patent
Yamane et al.

(10) Patent No.: US 11,920,636 B2
(45) Date of Patent: Mar. 5, 2024

(54) SEALING DEVICE

(71) Applicant: NOK CORPORATION, Tokyo (JP)

(72) Inventors: Shohei Yamane, Fukushima (JP); Hirofumi Miyano, Fukushima (JP); Kento Akimoto, Fukushima (JP)

(73) Assignee: NOK CORPORATION (JP)

(*) Notice: Subject to any disclaimer, the term of this patent is extended or adjusted under 35 U.S.C. 154(b) by 455 days.

(21) Appl. No.: 17/280,117

(22) PCT Filed: Nov. 5, 2019

(86) PCT No.: PCT/JP2019/043235
§ 371 (c)(1),
(2) Date: Mar. 25, 2021

(87) PCT Pub. No.: WO2020/110623
PCT Pub. Date: Jun. 4, 2020

(65) Prior Publication Data
US 2021/0341018 A1 Nov. 4, 2021

(30) Foreign Application Priority Data
Nov. 29, 2018 (JP) .................................. 2018-223142

(51) Int. Cl.
*F16C 33/78* (2006.01)
*B61F 15/22* (2006.01)
(Continued)

(52) U.S. Cl.
CPC .......... *F16C 33/7823* (2013.01); *B61F 15/22* (2013.01); *F16C 33/7883* (2013.01); *F16J 15/3232* (2013.01); *F16J 15/3256* (2013.01)

(58) Field of Classification Search
CPC .............. F16C 33/7823; F16C 33/7859; F16C 33/7863; F16C 33/7853; F16C 33/7869;
(Continued)

(56) References Cited

U.S. PATENT DOCUMENTS 3,501,155 A  3/1970  Dega et al.
5,511,886 A  4/1996  Sink
(Continued)

FOREIGN PATENT DOCUMENTS

EP  2088353 A1  8/2009
EP  3269989 A1  1/2018
(Continued)

OTHER PUBLICATIONS

Machine Translation of JP-09068232-A (Year: 1997).*
(Continued)

*Primary Examiner* — Alan B Waits
(74) *Attorney, Agent, or Firm* — Harness, Dickey & Pierce, P.L.C.

(57) ABSTRACT

A sealing device is disposed between an inner member and an outer member of a rolling bearing that rotate relative to each other, and that acts to seal a gap between the inner member and the outer member. The sealing device includes an annular rigid part that is to be fixed to an inside of a hole of the outer member, the rigid part made from a rigid material; and an elastic part fixed to the rigid part, the elastic part made from an elastic material. The elastic part includes a seal lip having a truncated cone ring shape that is to be in slidable contact with the inner member or a member fixed to the inner member. Multiple bumps are formed on an inner peripheral surface of the seal lip, and are to be always in slidable contact with the inner member or the member fixed to the inner member. Clearances are provided between the seal lip and the inner member or the member fixed to the inner member in vicinities of the bumps.

6 Claims, 6 Drawing Sheets

(51) Int. Cl.
*F16J 15/32* (2016.01)
*F16J 15/3232* (2016.01)
*F16J 15/3256* (2016.01)

(58) Field of Classification Search
CPC .............. F16C 33/7879; F16C 33/7883; F16C 2326/10; F16J 15/3232; F16J 15/3236; F16J 15/3256; B61F 15/22
See application file for complete search history.

(56) References Cited

U.S. PATENT DOCUMENTS

| | | | |
|---|---|---|---|
| 2015/0285380 A1* | 10/2015 | Nakagawa | F16J 15/3244 277/351 |
| 2018/0045247 A1* | 2/2018 | Inamasu | F16C 33/7856 |
| 2018/0274587 A1* | 9/2018 | Yano | F16C 33/7823 |
| 2019/0277340 A1 | 9/2019 | Shuto et al. | |

FOREIGN PATENT DOCUMENTS

| | | | | |
|---|---|---|---|---|
| FR | 2456888 A1 | 12/1980 | | |
| FR | 2636691 A1 | 3/1990 | | |
| JP | S54-063843 U | 5/1979 | | |
| JP | S60-077818 U | 5/1985 | | |
| JP | H02-094920 U | 7/1990 | | |
| JP | H04123871 U | 11/1992 | | |
| JP | H0942461 A | 2/1997 | | |
| JP | 09068232 A | * | 3/1997 | .......... F16C 33/7813 |
| JP | 09144767 A | * | 6/1997 | .......... F16C 33/7813 |
| JP | 2000-035136 A | 2/2000 | | |
| JP | 2003-004054 A | 1/2003 | | |
| JP | 2004-316795 A | 11/2004 | | |
| JP | 2009-74602 A | 4/2009 | | |
| JP | 2009-185968 A | 8/2009 | | |
| JP | 2012-072822 A | 4/2012 | | |
| JP | 2012-172821 A | 9/2012 | | |
| JP | 2014-084934 A | 5/2014 | | |
| JP | 2015-143564 A | 8/2015 | | |
| WO | 2018-097233 A1 | 5/2018 | | |

OTHER PUBLICATIONS

Machine Translation of JP-09144767-A (Year: 1997).*
Request for the Submission of an Opinion for corresponding Korean Application No. 10-2021-7008659 dated Nov. 16, 2022, with English translation (12 Pages).
Notice of Reasons for Refusal for corresponding Japanese Application No. 2020-558238 dated Dec. 7, 2021, with English translation (7 Pages).
First Office Action for corresponding Chinese Application No. 201980064530.3 dated May 19, 2022, with English translation (14 Pages).
Notice of Reasons for Refusal for corresponding Japanese Application No. 2020-558238 dated Jun. 28, 2022, with English translation (5 Pages).
International Search Report of the International Searching Authority (in English and Japanese) issued in PCT/JP2019/043235, dated Feb. 4, 2020; ISA/JP (7 pages).
Extended European Search Report for corresponding Application No. 19890437.7 dated Nov. 26, 2021 (9 Pages).

* cited by examiner

SEALING DEVICE

CROSS REFERENCE TO RELATED APPLICATIONS

This application is a U.S. National Phase Application under 35 U.S.C. 371 of International Application No. PCT/JP2019/043235 filed on Nov. 5, 2019 which claims the benefit of priority from Japanese Patent Application No. 2018-223142 filed on Nov. 29, 2018. The entire disclosures of all of the above applications are incorporated herein by reference.

TECHNICAL FIELD

The present invention relates to sealing devices for interior sealing of rolling bearings.

BACKGROUND ART

Patent Document 1 discloses a rolling bearing suitable for use in railroad vehicles. The interior of the rolling bearing is subject to temperature variations due to heat generated by friction between rolling elements and surrounding elements, resulting in changes in pressure inside the rolling bearing. The rolling bearing is provided with sealing devices for sealing lubricant therein, and the sealing devices are in slidable contact with the rotating inner race. Upon a change in pressure inside the bearing, a strong force acts on the sealing devices in contact with the inner race, and heat is generated by friction. To minimize heat generation, the bearing disclosed in Patent Document 1 is provided with a plug for venting air.

BACKGROUND DOCUMENTS

Patent Documents

Patent Document 1: Japanese Utility Model Publication 4-123871

SUMMARY OF THE INVENTION

Another approach for minimizing heat generation in a bearing is conceived in which a countermeasure for reducing heat generation is applied to a sealing device within the bearing, rather than to the bearing. In this case, it is desirable to ensure that the ability of the sealing device to seal a lubricant (grease) within the bearing, which is the original function of the device, is not compromised.

Accordingly, the present invention provides a sealing device that has a superior ability to seal a lubricant and that is capable of reducing a likelihood of heat generation due to an increase in friction even when an internal pressure in a bearing rises or falls.

According to an aspect of the present invention, a sealing device is disposed between an inner member and an outer member of a rolling bearing, which rotate relative to each other, for sealing a gap between the inner member and the outer member. The sealing device includes an annular rigid part that is to be fixed to an inside of a hole of the outer member, the rigid part being made from a rigid material; and an elastic part fixed to the rigid part, the elastic part being made from an elastic material. The elastic part includes a seal lip shaped as a truncated cone ring that is to be in slidable contact with the inner member or a member fixed to the inner member. Multiple bumps are formed on an inner peripheral surface of the seal lip. The bumps are always in slidable contact with the inner member or the member fixed to the inner member, and clearances are provided between the seal lip and the inner member or the member fixed to the inner member in vicinities of the bumps.

In this aspect, the seal lip, which is in slidable contact with the inner member or a member fixed to the inner member, seals the lubricant inside the bearing, resulting in a superior ability to seal the lubricant. On the other hand, multiple bumps formed on the inner peripheral surface of the seal lip are always in slidable contact with the inner member or the member fixed to the inner member, and small clearances exist between the seal lip and the inner member or the member fixed to the inner member in vicinities of the bumps. Air flows through the small clearances to/from the inside of the bearing and from/to the outside of the bearing, so that the seal lip and/or another lip are not pressed against or attracted to the inner member or the member fixed to the inner member, thereby reducing a likelihood of heat generation due to an increase in friction even when the internal pressure in the bearing rises or falls.

DESCRIPTION OF EMBODIMENTS

Hereinafter, with reference to the accompanying drawings, various embodiments according to the present invention will be described. It is of note that the drawings do not necessarily accurately show relative dimensional ratios of actual products according to the embodiments and some dimensions may be exaggerated.

First Embodiment

Figure 1:
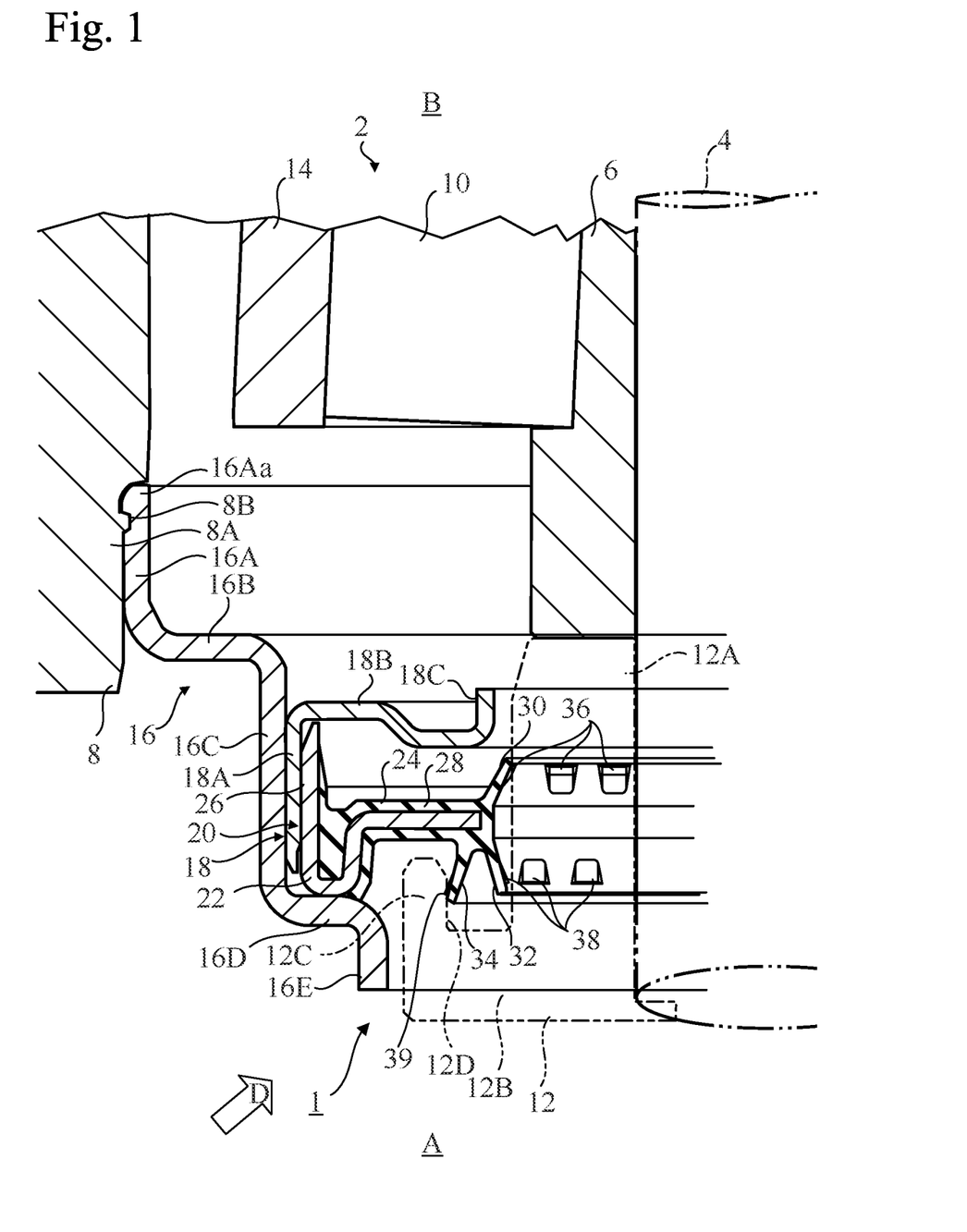
FIG. 1 is a cross-sectional view of a sealing device according to a first embodiment of the present invention.

FIG. 1 shows a bearing for an axle of a railroad vehicle, which is an example of a rolling bearing 2 in which a sealing device 1 according to a first embodiment of the present invention is used. The present invention is not limited to bearings for railroad vehicles, and is applicable to axle bearings of large automotive vehicles such as trucks and buses. The illustrated rolling bearing 2 is an RCT (Rotating End Cap Tapered Roller) bearing. However, use of the present invention is not limited to RCT bearings, and the present invention is also applicable to other rolling bearings having other types of rolling elements, such as RCC (Rotating End Cap) bearings, ball bearings, and needle bearings.

As shown in FIG. 1, the rolling bearing 2 includes an inner race (inner member) 6 into which an axle 4 is inserted, an outer race (outer member) 8 arranged outside the inner race 6, multiple rollers 10 aligned in a row between the inner race 6 and the outer race 8, an oil stopping member (inner member) 12 into which the axle 4 is to be inserted, and a retainer 14 that retains the row of the rollers 10 in a fixed position. Whereas the outer race 8 is stationary, the inner race 6 and the oil stopping member 12 rotate with rotation of the axle 4. The retainer 14 is fixed to the outer race 8.

The oil stopping member 12 includes a cylindrical part 12A with an outer diameter and an inner diameter that are the same as those of the inner race 6, a flange 12B extending from the end on the atmosphere side A of the cylindrical part 12A, and an outer cylindrical part 12C extending from the outer edge of the flange 12B toward the bearing inner side B. The cylindrical part 12A, the flange 12B, and the outer cylindrical part 12C define a circumferential groove 12D. In FIG. 1, the oil stopping member 12 is depicted by phantom lines.

The sealing device 1 is located between the oil stopping member 12 and the outer race 8, which rotate relative to each other, and acts to seal the gap between the oil stopping member 12 and the outer race 8. The sealing device 1 acts to prevent or reduce outflow of grease, i.e., lubricant, from the inside of the rolling bearing 2, and to prevent or reduce ingress of foreign matter (water, including muddy water and salt water) and/or dust (including iron dust)) from the outside to the inside of the rolling bearing 2. In FIG. 1, arrow D indicates an example of the flow direction of foreign matter from the outside.

In FIG. 1, only the left side with respect to the axle 4 is shown, but the rotational shapes of sealing device 1 and the rolling bearing 2 are symmetric. The upper side of FIG. 1 is the bearing inner side B, and the lower side is the atmosphere side A. However, another sealing device similar to the sealing device 1 is provided on the opposite side of the rolling bearing 2 from the sealing device 1.

The sealing device 1 includes three annular sealing members, i.e., an outer sealing member 16, an intermediate sealing member 18, and an inner sealing member 20.

The outer sealing member 16 is made from a rigid material such as a metal. The outer sealing member 16 includes an outer cylindrical section 16A that is to be fixedly engaged in the hole 8A of the outer race 8, a circular annular section 16B, an intermediate cylindrical section 16C, a circular annular section 16D, and an inner cylindrical section 16E. The cylindrical sections 16A, 16C, and 16E are cylinders that are coaxial to one another.

The outer cylindrical section 16A is fixedly engaged in the inner peripheral surface of the hole 8A of the outer race 8 by interference fit. The end portion 16Aa on the bearing inner side B of the outer cylindrical section 16A is hook-shaped and extends radially outward. A ridge 8B extending in a circumferential direction is formed in the hole 8A, and a circumferential groove into which the ridge 8B is fitted is formed in the end portion 16Aa of the outer cylindrical section 16A.

The circular annular section 16B extends radially inward from the end on the atmosphere side A of the outer cylindrical section 16A. The circular annular section 16B lies on a plane that is perpendicular to the axial direction of the axle 4.

The intermediate cylindrical section 16C extends from the inner edge of the circular annular section 16B toward the atmosphere side A.

The circular annular section 16D extends radially inward from the end on the atmosphere side A of the intermediate cylindrical section 16C. The circular annular section 16D lies on a plane that is perpendicular to the axial direction of the axle 4.

The inner cylindrical section 16E extends from the inner edge of the circular annular section 16D toward the atmosphere side A. An annular clearance is provided between the inner peripheral surface of the inner cylindrical section 16E and the outer peripheral surface of the outer cylindrical part 12C of the oil stopping member 12.

The intermediate sealing member 18 is formed from a rigid material, for example, a metal. The intermediate sealing member 18 includes an outer cylindrical section 18A that is to be fixed to the outer sealing member 16, a circular annular section 18B, and an inner cylindrical section 18C. The outer cylindrical sections 18A and 18C are cylinders that are coaxial to each other.

The outer cylindrical section 18A is engaged by interference fit with the inner peripheral surface of the intermediate cylindrical section 16C of the outer sealing member 16.

The circular annular section 18B extends radially inward from the end on the bearing inner side B of the outer cylindrical section 18A. The circular annular section 18B generally lies on a plane that is perpendicular to the axial direction of the axle 4, but is curved.

The inner cylindrical section 18C extends from the inner edge of the circular annular section 18B toward the bearing inner side B. An annular clearance is provided between the inner peripheral surface of the inner cylindrical section 18c and the outer peripheral surface of the cylindrical part 12A of the oil stopping member 12.

The inner sealing member 20 is arranged inside the outer sealing member 16 and the intermediate sealing member 18, and is disposed between the outer sealing member 16 and the oil stopping member 12, which rotate relative to each other to seal the gap between the outer sealing member 16 and the oil stopping member 12. Accordingly, the inner sealing member 20 can be considered as a sealing device.

The inner sealing member (sealing device) 20 has a composite structure that includes a rigid part 22 formed from a rigid material, for example, a metal, and an elastic part 24 formed from an elastic material, for example, an elastomer. The elastic part 24 is fixed to the rigid part 22, which reinforces the elastic part 24.

The inner sealing member 20 includes a mounted cylindrical section 26 that is fixed to the intermediate sealing member 18, a circular annular section 28, a seal lip (grease lip) 30, an auxiliary lip (dust lip) 32, and a side lip (dust lip) 34.

The mounted cylindrical section 26 includes the rigid part 22 and the elastic part 24, and is fixedly engaged with the inner peripheral surface of the outer cylindrical section 18A of the intermediate sealing member 18 by interference fit.

The circular annular section 28 includes the rigid part 22 and the elastic part 24, and extends radially inward from the mounted cylindrical section 26.

The elastic part 24 includes lips 30, 32, and 34.

The seal lip 30 is a radial lip shaped as a truncated cone ring, and extends diagonally (radially inward and toward the bearing inner side B) from the inner end of the circular annular section 28. The seal lip 30 extends toward the outer peripheral surface of the cylindrical part 12A of the oil stopping member 12, and the distal end of the seal lip 30 is in contact with the outer peripheral surface of the cylindrical part 12A so as to be slidable over the entire circumference.

Primarily, the seal lip 30 acts to prevent or reduce leakage of the lubricant from the bearing inner side B to the atmosphere side A.

The auxiliary lip 32 is a radial lip shaped as a truncated cone ring, and extends diagonally (radially inward and toward the atmosphere side A) from the inner end of the circular annular section 28. The auxiliary lip 32 is located inside the circumferential groove 12D of the oil stopping member 12, and extends to the outer peripheral surface of the cylindrical part 12A of the oil stopping member 12. In this embodiment, the distal end of the auxiliary lip 32 is in contact with the outer peripheral surface of the cylindrical part 12A of the oil stopping member 12 so as to be slidable over the entire circumference. Primarily, the auxiliary lip 32 acts to prevent or reduce ingress of foreign matter from the atmosphere side A to the bearing inner side B, but also acts to prevent or reduce leakage of the lubricant from the bearing inner side B to the atmosphere side A.

The side lip 34 is a radial lip shaped as a truncated cone ring, and extends diagonally (radially outward and toward the atmosphere side A) from the inner end of the circular annular section 28. The side lip 34 is located inside the circumferential groove 12D of the oil stopping member 12, and extends to the inner peripheral surface of the outer cylindrical part 12C of the oil stopping member 12. In this embodiment, the distal end of the side lip 34 is in contact with the inner peripheral surface of the outer cylindrical part 12C of the oil stopping member 12 so as to be slidable over the entire circumference. Primarily, the side lip 34 acts to prevent or reduce ingress of foreign matter from the atmosphere side A to the bearing inner side B, but also acts to prevent or reduce leakage of the lubricant from the bearing inner side B to the atmosphere side A.

Figure 2:
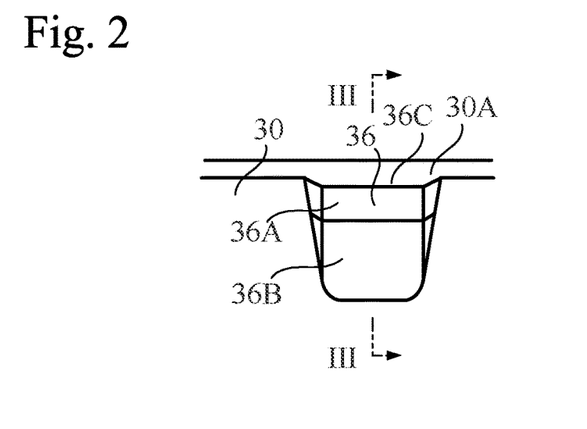
FIG. 2 is a front view of a bump in the sealing device of FIG. 1.
Figure 3:
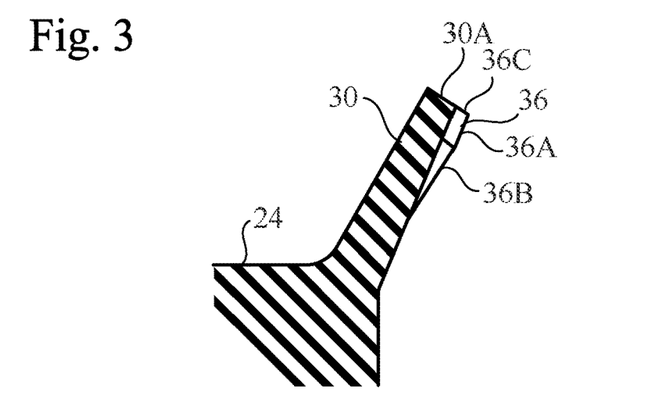
FIG. 3 is a cross-sectional view taken along line III-III in FIG. 2.

Multiple bumps 36 are formed on the inner peripheral surface of the seal lip 30. As shown in FIGS. 2 and 3, each bump 36 is arranged at a position that abuts the distal edge 30A of the seal lip 30. Each bump 36 has a parallel surface 36A, an inclined surface 36B, and a perpendicular surface 36C. The parallel surface 36A is a flat surface parallel to the inner peripheral surface of the seal lip 30. The inclined surface 36B is continuous with the parallel surface 36A, and the height thereof gradually decreases from the parallel surface 36A toward the inner peripheral surface of the seal lip 30. The perpendicular surface 36C is perpendicular to the inner peripheral surface of the parallel surface 36A and the seal lip 30, and is flush with the distal edge 30A of the seal lip 30.

Figure 4:
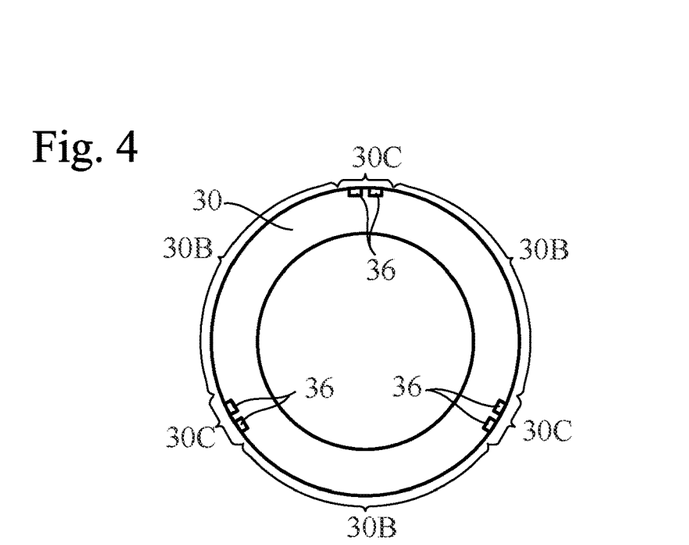
FIG. 4 is a drawing showing an arrangement of bumps in a seal lip of the sealing device of FIG. 1.

As shown in FIG. 4, in this embodiment, there are provided three sets including two bumps 36. The three sets are equiangularly spaced; in other words, are spaced 120 degrees apart from one another. However, the arrangement and the number of the bumps 36 are not limited to this embodiment.

The bumps 36 are always in slidable contact with the outer peripheral surface of the cylindrical part 12A of the oil stopping member 12. Thus, in the inner peripheral surface of the seal lip 30 shown in FIG. 4, there are provided clearances between the seal lip 30 and the cylindrical part 12A in vicinities 30C of the bumps 36, although parts 30B that are distant from the bumps 36 are in contact with the outer peripheral surface of the cylindrical part 12A of the oil stopping member 12.

In this embodiment, as described above, the seal lip 30 slidably contacts the outer peripheral surface of the cylindrical part 12A of the oil stopping member 12, and acts to seal the lubricant inside the rolling bearing 2, resulting in a superior ability to seal the lubricant.

On the other hand, multiple bumps 36 formed on the inner peripheral surface of the seal lip 30 are always in slidable contact with the outer peripheral surface of the cylindrical part 12A of the oil stopping member 12, and small clearances exist between the seal lip 30 and the outer peripheral surface of the cylindrical part 12A of the oil stopping member 12 in the vicinities 30C of the bumps.

If the seal lip 30 is in contact with the entire circumference of the outer peripheral surface of the cylindrical part 12A, when the pressure inside the rolling bearing 2 rises, the seal lip 30 is pressed against the outer peripheral surface of the cylindrical part 12A of the oil stopping member 12, thereby resulting in an increase in friction, and a consequent likelihood of heat being generated. However, in this embodiment, air flows through the small clearances between the seal lip 30 and the outer peripheral surface of the cylindrical part 12A of oil stopping member 12, to/from the inside of the rolling bearing 2 (bearing inner side B) and from/to the outside of the rolling bearing 2 (atmosphere side A), thereby reducing a likelihood of heat generation due to an increase in friction even when the internal pressure in the rolling bearing 2 rises.

As described above, in this embodiment, each bump 36 includes the parallel surface 36A, which is parallel to the inner peripheral surface of the seal lip 30, and the inclined surface 36B of which the height gradually decreases from the parallel surface 36A toward the inner peripheral surface of the seal lip 30. Accordingly, as described below, it is easy to form each bump 36 to have a target height relative to the inner peripheral surface of the seal lip 30.

Figure 5:
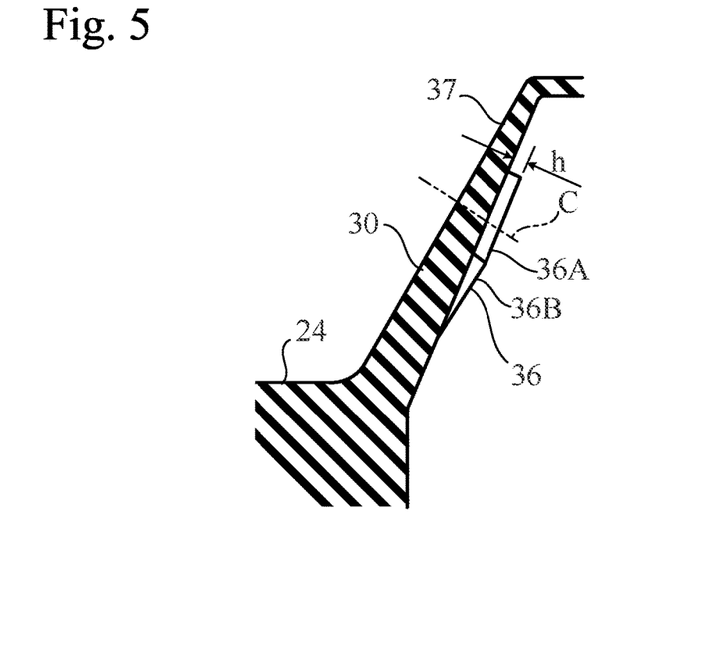
FIG. 5 is a cross-sectional view of the seal lip formed with a mold.

The inner sealing member 20 in which the bumps 36 are formed can be shaped by use of, for example, a mold. Injection molding or press molding may be used to shape the inner sealing member 20, for example. FIG. 5 is a cross-sectional view of the seal lip 30 formed by use of a mold. Immediately after molding, a trace portion 37 is formed integral with the seal lip 30. The trace portion 37 is a trace of the material path in the mold that spreads the elastic material in the desired cavity. The trace portion 37 extends from the seal lip 30 and has a portion that extends from the bump 36. By cutting the molded product at a virtual surface C to remove the unnecessary trace portion 37, the seal lip 30 can be finished together with the bumps 36.

If the parallel surface 36A of a bump 36 is not parallel to the inner peripheral surface of the seal lip 30 and lies on an extended surface of the inclined surface 36B, and the cutting position in the finish forming is not the target position, the height h of the bump 36 relative to the inner peripheral surface of the seal lip 30 will not be the target height. Accordingly, highly close attention is required cutting process.

On the other hand, in this embodiment, each bump 36 has a parallel surface 36A that is parallel to the inner peripheral surface of the seal lip 30. Accordingly, even if the cutting position deviates from the target position, the height h of the bump 36 (the distance between the parallel surface 36A and the inner peripheral surface of the seal lip 30) relative to the inner peripheral surface of the seal lip 30 will be the target height. However, the parallel surface 36A of the bump 36 is not essential.

Figure 6:
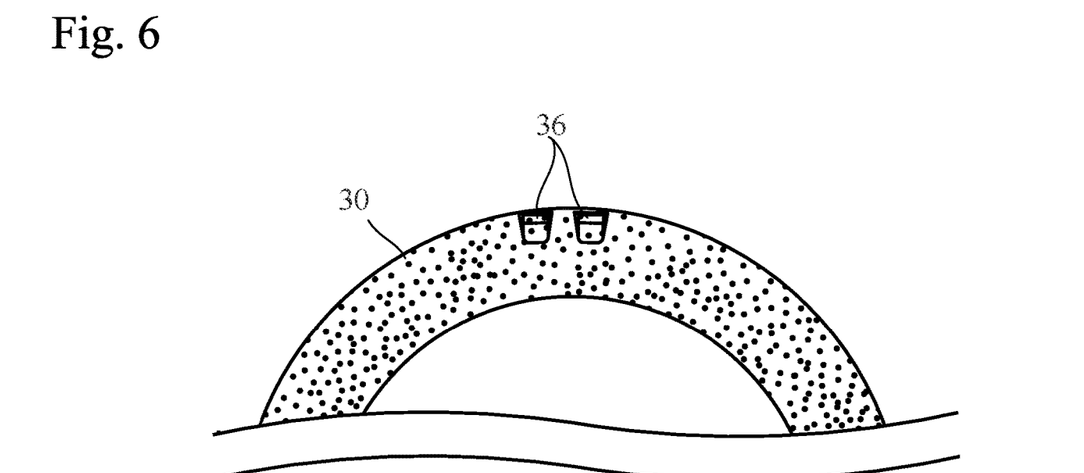
FIG. 6 is a front view showing a part of the seal lip.

As shown in FIG. 6, it is preferable that minute convexities and concavities be formed on the inner peripheral surface of the seal lip 30 including the bumps 36. The minute convexities and concavities can be irregularly formed by matting. In this case, the minute convexities and concavities on the inner peripheral surface of the seal lip 30 reduce frictional resistance of the seal lip 30 and minimize heat generation and torque.

In addition, the minute convexities and concavities of the inner peripheral surface of the seal lip 30 create minute gaps between the seal lip 30 and the outer peripheral surface of the cylindrical part 12A of the oil stopping member 12. Air flows through the minute gaps, to/from the inside of the rolling bearing 2 (bearing inner side B) and from/to the outside of the rolling bearing 2 (atmosphere side A). Accordingly, even when the internal pressure in the rolling bearing 2 rises, the seal lip 30 is not pressed against the outer peripheral surface of the cylindrical part 12A of the oil stopping member 12, thereby reducing a likelihood of heat generation due to an increase in friction.

The ten point height of irregularities Rz of the inner peripheral surface of the seal lip 30 having minute convexities and concavities is preferably 15 μm or more and 30 μm or less. In a case in which the roughness of the inner peripheral surface of the seal lip 30 is less than 15 μm, the minute gaps are small and air flow is small. On the other hand, in a case in which the roughness of the inner peripheral surface of seal lip 30 is greater than 30 μm, the lubricant may leak from the inside of the rolling bearing 2 to the outside through the minute gaps. In a case in which the ten point height of irregularities Rz of the inner peripheral surface of the seal lip 30 is equal to or greater than 15 μm and is equal to or less than 30 μm, sealing of the lubricant by the seal lip 30 and air flow can both be achieved.

As shown in FIG. 1, in the inner sealing member 20 of this embodiment, the distal end of the auxiliary lip 32 slidably contacts the outer peripheral surface of the cylindrical part 12A of the oil stopping member 12. However, the distal end of the auxiliary lip 32 need not contact the oil stopping member 12, in which case an annular clearance will exist between the distal end of the auxiliary lip 32 and the oil stopping member 12. If the clearance is small, the auxiliary lip 32 can prevent or reduce ingress of foreign matter from the atmosphere side A to the bearing inner side B.

In addition, the distal end of the side lip 34 slidably contacts the inner peripheral surface of the outer cylindrical part 12C of the oil stopping member 12, but the distal end of the side lip 34 need not contact the oil stopping member 12. In this case, there will be an annular clearance between the distal end of the side lip 34 and the oil stopping member 12, but if the clearance is small, the side lip 34 can prevent or reduce ingress of foreign matter from the atmosphere side A to the bearing inner side B.

In the embodiment in which the distal end of the auxiliary lip 32 slidably contacts the outer peripheral surface of the cylindrical part 12A of the oil stopping member 12, multiple bumps 38 are also formed on the inner peripheral surface of the auxiliary lip 32. The bumps 38 are always in slidable contact with the outer peripheral surface of the cylindrical part 12A of the oil stopping member 12. Thus, in the inner peripheral surface of the auxiliary lip 32, there are provided clearances between the auxiliary lip 32 and the cylindrical part 12A in vicinities of the bumps 38, although parts that are distant from the bumps 38 are in contact with the outer peripheral surface of the cylindrical part 12A of the oil stopping member 12. Accordingly, whereas an ability of the auxiliary lip 32 to seal the lubricant is high, even if the pressure inside the rolling bearing 2 falls, the auxiliary lip 32 is not strongly attracted to the outer peripheral surface of the cylindrical part 12A, and the risk of heat generation is reduced.

In a manner similar to that of the bumps 36, there can be provided three sets including two bumps 38, and the three sets can be equiangularly spaced; in other words, spaced 120 degrees apart from one another. However, the arrangement and the number of the bumps 38 are not limited to this embodiment.

In this embodiment, each bump 38 does not have a parallel surface corresponding to the parallel surface 36A of each bump 36, and has only a surface inclined relative to the inner peripheral surface of the auxiliary lip 32. However, each bump 38 may be placed at a position that abuts the distal edge of the auxiliary lip 32, and a parallel surface corresponding to the parallel surface 36A of each bump 36 may be provided on each bump 38. In this case, it is easy to form each bump 38 to have a target height relative to the inner peripheral surface of the auxiliary lip 32.

Similar to the inner peripheral surface of the seal lip 30, it is preferable that minute convexities and concavities be formed on the inner peripheral surface of the auxiliary lip 32 including the bumps 38. The minute convexities and concavities can be irregularly formed by matting. In this case, the minute convexities and concavities on the inner peripheral surface of the auxiliary lip 32 reduce frictional resistance of the auxiliary lip 32 and minimize heat generation and torque. In addition, air flows through minute gaps created by the minute convexities and concavities. Accordingly, even when the internal pressure in the rolling bearing 2 falls, the auxiliary lip 32 is not strongly attracted to the outer peripheral surface of the cylindrical part 12A of the oil stopping member 12, thereby reducing a likelihood of heat generation due to an increase in friction.

The ten point height of irregularities Rz of the inner peripheral surface of the auxiliary lip 32 having minute convexities and concavities is preferably 15 μm or more and 30 μm or less. In a case in which the ten point height of irregularities Rz of the inner peripheral surface of the auxiliary lip 32 is equal to or greater than 15 μm and is equal to or less than 30 μm, sealing of the lubricant by the auxiliary lip 32 and air flow can both be achieved.

In the embodiment in which the distal end of the side lip 34 slidably contacts the inner peripheral surface of the outer cylindrical part 12C of the oil stopping member 12, multiple bumps 39 are also formed on the outer peripheral surface of the side lip 34. The bumps 39 are always in slidable contact with the inner peripheral surface of the outer cylindrical part 12C of the oil stopping member 12. Thus, in the outer peripheral surface of the side lip 34, there are provided clearances between the side lip 34 and the outer cylindrical part 12C in vicinities of the bumps 39, although parts that are distant from the bumps 39 are in contact with the inner peripheral surface of the outer cylindrical part 12C of the oil stopping member 12. Accordingly, whereas an ability of the side lip 34 with the bumps 39 to seal the lubricant is high, even if the pressure inside the rolling bearing 2 rises, the side lip 34 is not strongly pressed against the inner peripheral surface of the outer cylindrical part 12C, and the risk of heat generation is reduced.

In a manner similar to that of the bumps 36, there can be provided three sets including two bumps 39, and the three sets can be equiangularly spaced; in other words, spaced 120 degrees apart from one another. However, the arrangement and the number of the bumps 39 are not limited to this embodiment.

In this embodiment, each bump 39 does not have a parallel surface corresponding to the parallel surface 36A of each bump 36, and only has a surface inclined relative to the outer peripheral surface of the side lip 34. However, each bump 39 may be placed at a position that abuts the distal edge of the side lip 34, and a parallel surface corresponding to the parallel surface 36A of each bump 36 may be provided on each bump 39. In this case, it is easy to form each bump 39 such that it has a target height relative to the outer peripheral surface of the side lip 34.

Similar to the inner peripheral surface of the seal lip 30, it is preferable that minute convexities and concavities be formed on the outer peripheral surface of the side lip 34 including the bumps 39. The minute convexities and concavities can be irregularly formed by matting. In this case, the minute convexities and concavities on the outer peripheral surface of the side lip 34 reduce the frictional resistance of the side lip 34 and minimize heat generation and torque. In addition, air flows through minute gaps created by the minute convexities and concavities. Accordingly, even when the internal pressure in the rolling bearing 2 rises, the side lip 34 is not strongly pressed against the inner peripheral surface of the outer cylindrical part 12C of the oil stopping member 12, thereby reducing a likelihood of heat generation due to an increase in friction.

The ten point height of irregularities Rz of the outer peripheral surface of the side lip 34 having minute convexities and concavities is preferably 15 μm or more and 30 μm or less. In a case in which the ten point height of irregularities Rz of the outer peripheral surface of the side lip 34 is equal to or greater than 15 μm and is equal to or less than 30 μm, sealing of the lubricant by the side lip 34 and air flow can both be achieved.

Second Embodiment

Figure 7:
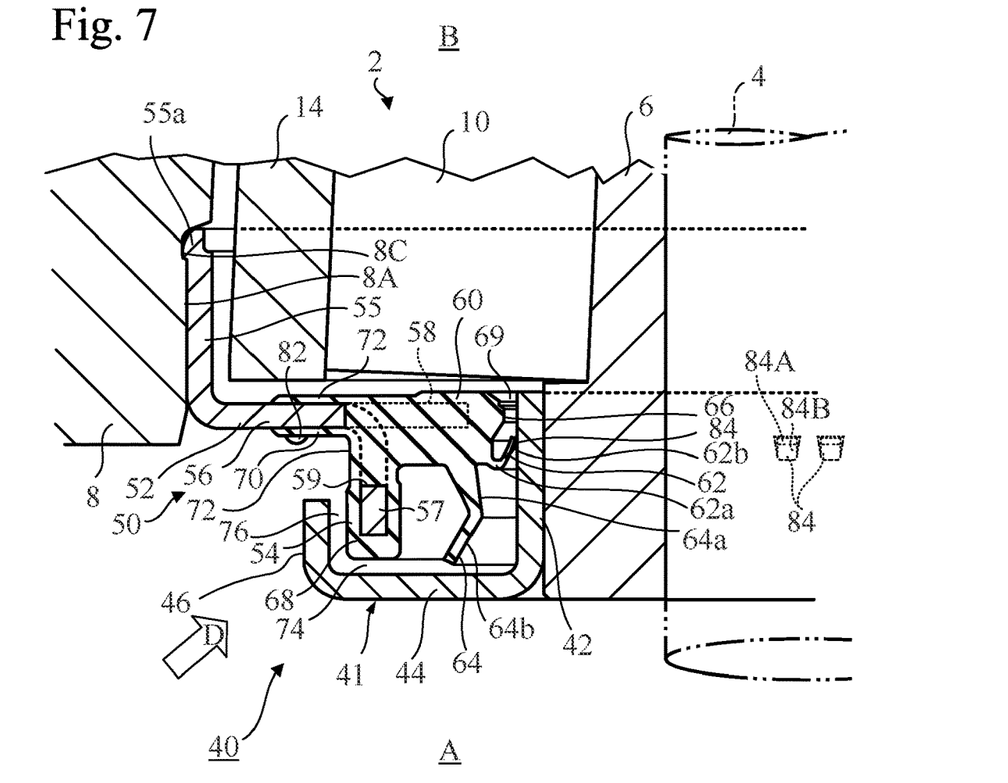
FIG. 7 is a cross-sectional view of a sealing device according to a second embodiment of the present invention.

FIG. 7 shows a sealing device 40 according to a second embodiment of the present invention. In FIG. 7 and subsequent drawings, the same reference symbols are used to denote components already described, and such components will not be described in detail.

The sealing device 40 is disposed between the inner race 6 and the outer race 8, which rotate relative to each other, and acts to seal the gap between the inner race 6 and the outer race 8. The sealing device 40 acts to prevent or reduce outflow of grease, i.e., lubricant, from the inside of the rolling bearing 2, and to prevent or reduce ingress of foreign matter from the outside to the inside of the rolling bearing 2. In FIG. 7, arrow D indicates an example of the flow direction of foreign matter from the outside.

In FIG. 7, only the left side with respect to the axle 4 is shown, but the sealing device 40 and the rolling bearing 2 have rotationally symmetric shapes. The upper side of FIG. 7 is the bearing inner side B, and the lower side is the atmosphere side A. However, another sealing device similar to the sealing device 40 is provided on the opposite side of the rolling bearing 2 from the sealing device 40.

The sealing device 40 includes an annular inner sealing member 41 and an annular outer sealing member 50. The inner sealing member 41 is fixed to the inner race 6. The outer sealing member 50 is fixed to the internal surface of the hole 8A of the outer race 8, and the inner sealing member 41 is in slidable contact with the outer sealing member 50.

The inner sealing member 41 is made from a rigid material, for example, a metal. The inner sealing member 41 includes a sleeve 42, a flange 44, and an outer sleeve 46. The sleeve 42 is fixed to the inner race 6 by, for example, an interference fit method. The flange 44 extends radially outside from the end portion of the sleeve 42 on the atmosphere side. The outer sleeve 46 extends along the axial direction of the inner sealing member 41 from the outer edge of the flange 44 toward the bearing inner side B.

The outer sealing member 50 is disposed between the outer race 8 and the inner sealing member 41, which rotate relative to each other, and acts to seal the gap between the outer race 8 and the inner sealing member 41. Accordingly, the outer sealing member 50 can be considered as a sealing device.

The outer sealing member (sealing device) 50 has a composite structure that includes a rigid part 52 formed from a rigid material, for example, a metal, and an elastic part 54 formed from an elastic material, for example, an elastomer. The rigid part 52 is fixed to the elastic part 54 to reinforce the elastic part 54.

The rigid part 52 includes a cylindrical section 55 fixedly engaged with the internal surface of the hole 8A of the outer race 8, a circular annular section 56, multiple axial direction projections 57, and multiple inner extending sections 58.

The cylindrical section 55 is engaged with the internal surface of the hole 8A of the outer race 8 by interference fit. The end portion 55a on the bearing inner side B of the cylindrical section 55 is hook-shaped and extends radially outward. A circumferential groove, that is, a concave portion 8C is formed in the hole 8A, in which the end portion 55a of the cylindrical section 55 is engaged.

The circular annular section 56 extends radially inward from the end portion of the cylindrical section 55 on the atmosphere side A. The circular annular section 56 lies on a plane perpendicular to the axial direction of the outer sealing member 50.

Figure 8:
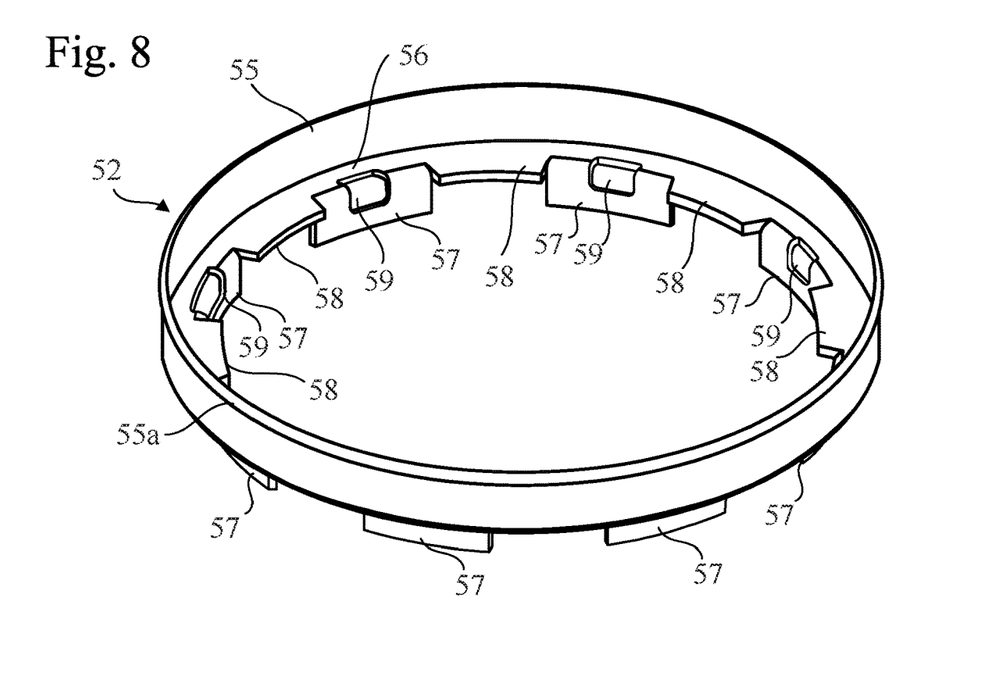
FIG. 8 is a perspective view showing a rigid body part of the sealing device in FIG. 7.

The axial direction projections 57 protrude along the axial direction of the outer sealing member 50 from the circular annular section 56 toward the atmosphere side A. As shown in FIG. 8, the axial direction projections 57 have shapes in which multiple portions spaced apart at angular intervals from one another in the circumferential direction in the circular annular section 56 are folded. In addition, multiple portions in the circular annular section 56 at which the multiple axial direction projections 57 are not formed are continuous with multiple inner extending sections 58 that extend radially inward from the circular annular section 56. Preferably, the axial direction projections 57 are arranged at equiangular intervals and the inner extending sections 58 are also arranged at equiangular intervals, but the angular intervals need not be equal. In this embodiment, eight axial direction projections 57 and eight inner extending sections 58 are provided, but the number of axial direction projections 57 and the number of inner extending sections 58 may be an unlimited number of two or more.

Referring back to FIG. 7, a recess 59 that extends inward in the radial direction is formed on the radial outer surface of each axial direction projection 57. In this embodiment, the recesses 59 are through-holes, but the recesses 59 need not penetrate the axial direction projections 57.

The elastic part 54 includes an annular proximal section 60 supported by the rigid part 52, a seal lip (grease lip) 62, a dust lip (side lip) 64, a radial direction protrusion 66, and a tubular wall section 68.

The proximal section 60 of the elastic part 54 is an annular section located radially inward of the axial direction projections 57 of the rigid part 52, and is fixed to the inner extending sections 58 of the rigid part 52. The inner extending sections 58 that are intermittently arranged in the circumferential direction are embedded in the annular proximal section 60 that is continuous in the circumferential direction, so that the inner extending sections 58 reinforce the proximal section 60.

The seal lip 62 is a plate-like ring that extends from the proximal section 60 and is in slidable contact with the outer peripheral surface of the sleeve 42 of the inner sealing member 41. Primarily, the seal lip 62 acts to prevent or reduce leakage of the lubricant from the bearing inner side B to the atmosphere side A. The seal lip 62 has a proximal end portion 62a shaped as a truncated cone ring that extends from the proximal section 60 toward the atmosphere side A and radially inward, and a distal end portion 62b shaped as a truncated cone ring and that obliquely extends from the proximal end portion 62a toward the bearing inner side B and radially inward. The distal end of the distal end portion 62b is in contact with the outer peripheral surface of the sleeve 42 of the inner sealing member 41 so as to be slidable over the entire circumference. The thickness of the proximal end portion 62a is greater than the thickness of the distal end portion 62b.

The dust lip 64 is a plate-like ring that extends from the proximal section 60 and is in slidable contact with the side surface of the flange 44 of the inner sealing member 41 on the bearing inner side B. Primarily, the dust lip 64 acts to prevent or reduce ingress of foreign matter from the atmosphere side A to the bearing inner side B. The dust lip 64 has a proximal end portion 64a that extends from the proximal section 60 toward the atmosphere side A and radially inward, and a distal end portion 64b that extends from the proximal end portion 64a toward the atmosphere side A and radially outward. The distal end portion 64b extends toward the side surface on the bearing inner side B of the flange 44 of the inner sealing member 41. The thickness of the proximal end portion 64a is greater than the thickness of the distal end portion 64b.

The radial direction protrusion 66 protrudes radially inward from the inner edge of the proximal section 60. The radial direction protrusion 66 has a trapezoidal cross section with a width that is broader at the radial outer side and narrower at the radial inner side. The radial direction protrusion 66 is not in contact with the inner sealing member 41, and a small annular clearance 69 is provided between the radial direction protrusion 66 and the sleeve 42 of the inner sealing member 41. The clearance 69 assists the sealing ability of the seal lip 62 by impeding flow of lubricant from the bearing inner side B to the atmosphere side A and reducing the amount of lubricant reaching the seal lip 62.

The tubular wall section 68 is a cylindrical section that extends from the outer edge of the proximal section 60 toward the flange 44 of the inner sealing member 41, and is fixed to the multiple axial direction projections 57 of the rigid part 52. The axial direction projections 57, which are arranged intermittently in the circumferential direction, are embedded in the cylindrical tubular wall section 68 that is continuous in the circumferential direction, so that the axial direction projections 57 reinforce the tubular wall section 68.

In the elastic part 54, not only the inner extending sections 58 of the rigid part 52, but also a part of the circular annular section 56 and the entirety of the axial direction projections 57 are embedded. Specifically, a part of the surface on the atmosphere side A of the circular annular section 56 is covered by a portion 70 of the elastic part 54, and a part of the surface on the bearing inner side B of the circular annular section 56 is covered by a portion 72 of the elastic part 54, whereas the axial direction projections 57 are covered by the tubular wall section 68 of the elastic part 54. However, the circular annular section 56 need not be covered with an elastic material.

The axial direction projections 57 provided intermittently on the rigid part 52 of the outer sealing member 50 and the tubular wall section 68 of the elastic part 54 extend toward the flange 44 of the inner sealing member 41. The tubular wall section 68 is not in contact with the flange 44, and an annular clearance 74 is provided between the tubular wall section 68 and the flange 44.

The outer sleeve 46 of the inner sealing member 41 is located outside the tubular wall section 68. The tubular wall section 68 is not in contact with the outer sleeve 46, and an annular clearance 76 is provided between the tubular wall section 68 and the outer sleeve 46.

In this embodiment, since the axial direction projections 57 are covered by the tubular wall section 68 of the elastic part 54, the elastic part 54 occludes the recesses 59 formed in the axial direction projections 57. In a portion of the tubular wall section 68 of the elastic part 54 covering the radial outer surface of each axial direction projection 57, portions 72 of the elastic part 54 that occlude the recesses 59 are concave. In manufacturing the sealing device 40, the material of the elastic part 54 greatly contracts in the vicinity of the recesses 59, so that the portions 72 become concave. Alternatively, it is possible to perform work for making the portions 72 concave after manufacture of the sealing device 40.

Figure 9:
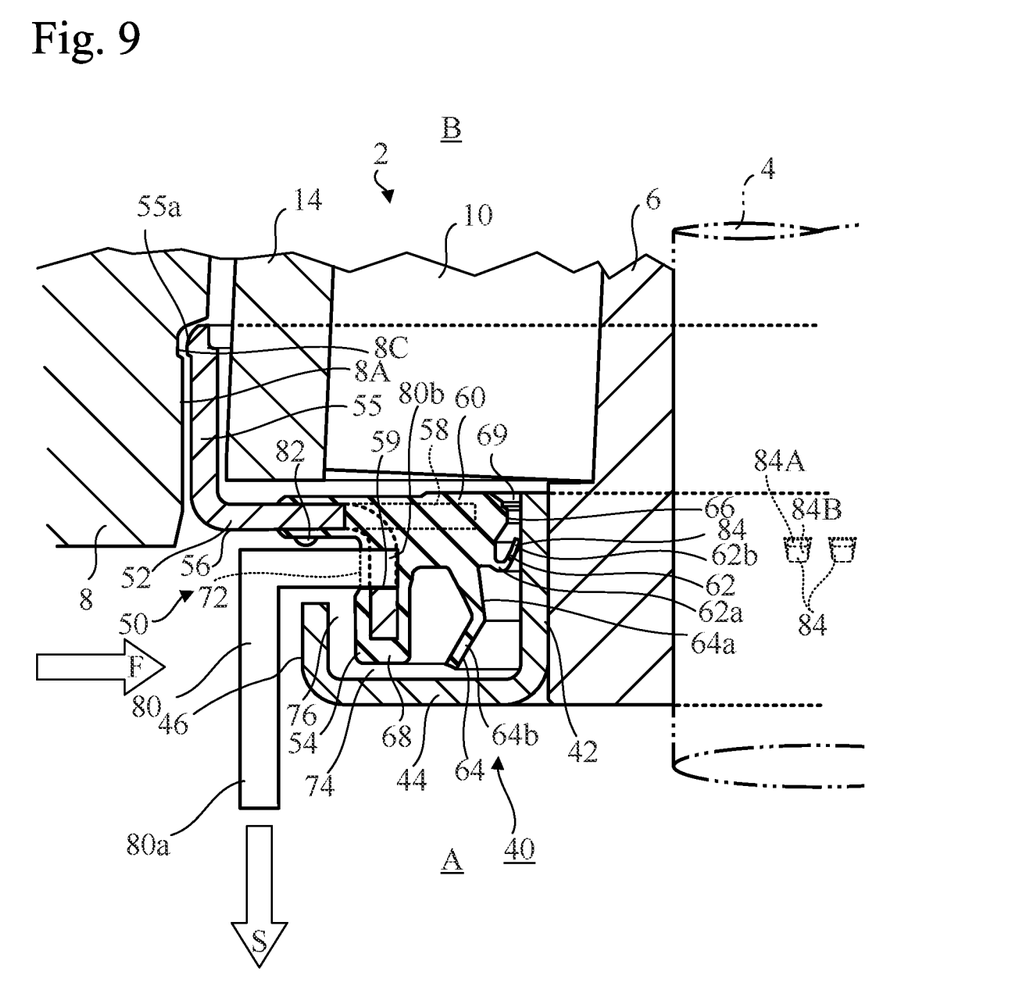
FIG. 9 is a cross-sectional view showing the sealing device of FIG. 7 in removal from a rolling bearing.

When the rolling bearing 2 is repaired it is necessary to replace the sealing device 40. With reference to FIG. 9, the removal operation of the sealing device 40 will be described.

First, multiple jigs 80 are prepared. The jig 80 has an elongated handle part 80a and a distal end part 80b that is bent relative to the handle part 80a. A mechanic grips the handle part 80a.

The recesses 59 are captured by the jigs 80 by inserting the distal end part 80b of each jig 80 into a recess 59 formed in an axial direction projection 57 of the rigid part 52 of the outer sealing member 50 of the sealing device 40. As in this embodiment, in a case in which the recesses 59 are occluded by portions of the elastic part 54, the portions are greatly compressed by the distal end parts 80b. Breakage of the portions is allowed.

In this state, under application of forces F directed radially inward to the outer sealing member 50 by the jigs 80, the elastic part 54, and thus the rigid part 52 of the outer sealing member 50, are compressed in radial directions, whereby the cylindrical section 55 of the rigid part 52 of the outer sealing member 50 is partially separated from the internal surface of hole 8A of outer race 8.

The outer sealing member 50 is then moved along the axial direction by pulling the jigs 80, the distal end portions 80b of which are inserted into the recesses 59, with a force S, whereby the outer sealing member 50 can be extracted from the hole 8A of the outer race 8 of the rolling bearing 2. Once the circular annular section 56 of the rigid part 52 of the outer sealing member 50 is partially separated from the internal surface of the hole 8A of the outer race 8, the outer sealing member 50 can be extracted with ease from the hole 8A of the outer race 8 of the rolling bearing 2 under elastic deformation of the outer sealing member 50. As the outer sealing member 50 is extracted, the flange 44 is pushed by the tubular wall section 68 of the outer sealing member 50, so that the inner sealing member 41 fixed to the inner race 6 can also be extracted together with the outer sealing member 50. Thus, the sealing device 40 can be removed with ease. However, the outer sealing member 50 and the inner sealing member 41 need not necessarily be removed at the same time, and the outer sealing member 50 may be pulled out from the outer race 8 after the inner sealing member 41 is pulled out from the inner race 6.

This removal operation uses multiple jigs 80, but a mechanic may manually perform the operation instead of the jigs 80. Even when multiple jigs 80 are used, the jigs 80 may be used to pull out only the outer sealing member 50 from the hole 8A of the outer race 8 by applying the force S to the outer sealing member 50. In other words, the outer sealing member 50 may be compressed in radial directions by applying forces F radially inward to the outer sealing member 50 either manually by the mechanic or by use of other jigs.

As shown in FIG. 8, the recesses 59 into which the jigs 80 are inserted are arranged at multiple locations separated by angular intervals in a circumferential direction. Each recess 59 is covered by a portion 72 of the elastic part 54. To insert the jig 80 or the mechanic's finger into one of the recesses 59, it is desirable to be able to easily locate the recess 59.

Accordingly, in this embodiment, as shown in FIGS. 7 and 9, multiple marks 82 are formed on the portion 70 of the elastic part 54 fixed to the surface on the atmosphere side A of the circular annular section 56. The marks 82 are arranged at positions that overlap the recesses 59 in radial directions. The mechanic can visually or tactilely recognize a mark 82 and thereby easily insert the jig 80 or the finger into the recess 59 corresponding to the mark 82. In this embodiment, each mark 82 is a hemispherical protrusion, but the shape of the mark 82 is not limited thereto, and may be a protrusion of another shape, a recess, or an engraved mark. Moreover, the mark 82 is not limited to a three-dimensional shape, and may be a visually recognizable colored or patterned mark on a plane.

Similar to the bumps 36 formed on the seal lip 30 in the first embodiment, multiple bumps 84 are formed on the distal end portion 62b of the side lip 62. The bumps 84 are always in slidable contact with the outer peripheral surface of the sleeve 42 of the inner sealing member 41. Thus, in the inner peripheral surface of the distal end portion 62b of the seal lip 62, there are provided clearances between the distal end portion 62b of the seal lip 62 and the sleeve 42 in vicinities of the bumps 84, although parts that are distant from the bumps 84 are in contact with the outer peripheral surface of the sleeve 42.

As described above, the seal lip 62 slidably contacts the outer peripheral surface of the sleeve 42 and seals the lubricant inside the rolling bearing 2, resulting in a superior ability to seal lubricant. On the other hand, multiple bumps 84 formed on the inner peripheral surface of the seal lip 62 are always in slidable contact with the outer peripheral surface of the sleeve 42, and small clearances exist between the seal lip 62 and the outer peripheral surface of the sleeve 42. Air flows through the small clearances between the seal lip 62 and the outer peripheral surface of the sleeve 42, to/from the inside of the rolling bearing 2 (bearing inner side B) and from/to the outside of the rolling bearing 2 (atmosphere side A), thereby reducing a likelihood of heat generation even when the internal pressure in the rolling bearing 2 rises.

Similar to the bump 36 formed in the seal lip 30 of the first embodiment, each bump 84 preferably has a parallel surface 84A that is parallel to the inner peripheral surface of the distal end portion 62b of the seal lip 62, and an inclined surface 84B of which the height gradually decreases from the parallel surface 84A toward the inner peripheral surface of the distal end portion 62b of the seal lip 62. In this case, it is easy to form each bump 84 such that it has a target height relative to the inner peripheral surface of the seal lip 62.

In addition, similar to in the seal lip 30 of the first embodiment, minute convexities and concavities (not shown) are formed on the inner peripheral surface, which includes the bumps 84, of the distal end portion 62b of the seal lip 62. The ten point height of irregularities Rz of the inner peripheral surface of the seal lip 62 having minute convexities and concavities is preferably 15 μm or more and 30 μm or less.

In this embodiment, the dust end portion 64b of the dust lip 64 is not in contact with the flange 44 of the inner sealing member 41, and therefore, an annular clearance is provided between the distal end portion 64b and the flange 44. However, the distal end portion 64b of the dust lip 64 may be in contact with the flange 44 of the inner sealing member 41, and in this case, multiple bumps (not shown) preferably are formed on the inner peripheral surface of the distal end portion 64b of the dust lip 64 such that the bumps are always in slidable contact with the flange 44. In the inner peripheral surface of the distal end portion 64b of the dust lip 64, there are provided clearances between the distal end portion 64b of the dust lip 64 and the flange 44 in vicinities of the bumps, although parts that are distant from the bumps are in contact with the flange 44. Air flows through the small clearances to/from the inside of the rolling bearing 2 (bearing inner side B) and from/to the outside of the rolling bearing 2 (atmosphere side A). Each bump preferably has a parallel surface that is parallel to the inner peripheral surface of the distal end portion 64b of the dust lip 64, and an inclined surface of which the height gradually decreases from the parallel surface toward the inner peripheral surface of the distal end portion 64b of the seal lip 64. In addition, minute convexities and concavities are preferably formed on the inner peripheral surface, which includes the bumps, of the distal end portion 64b of the dust lip 64. The ten point height of irregularities Rz of the inner peripheral surface of the dust lip 64 having minute convexities and concavities is preferably 15 μm or more and 30 μm or less.

Third Embodiment

Figure 10:
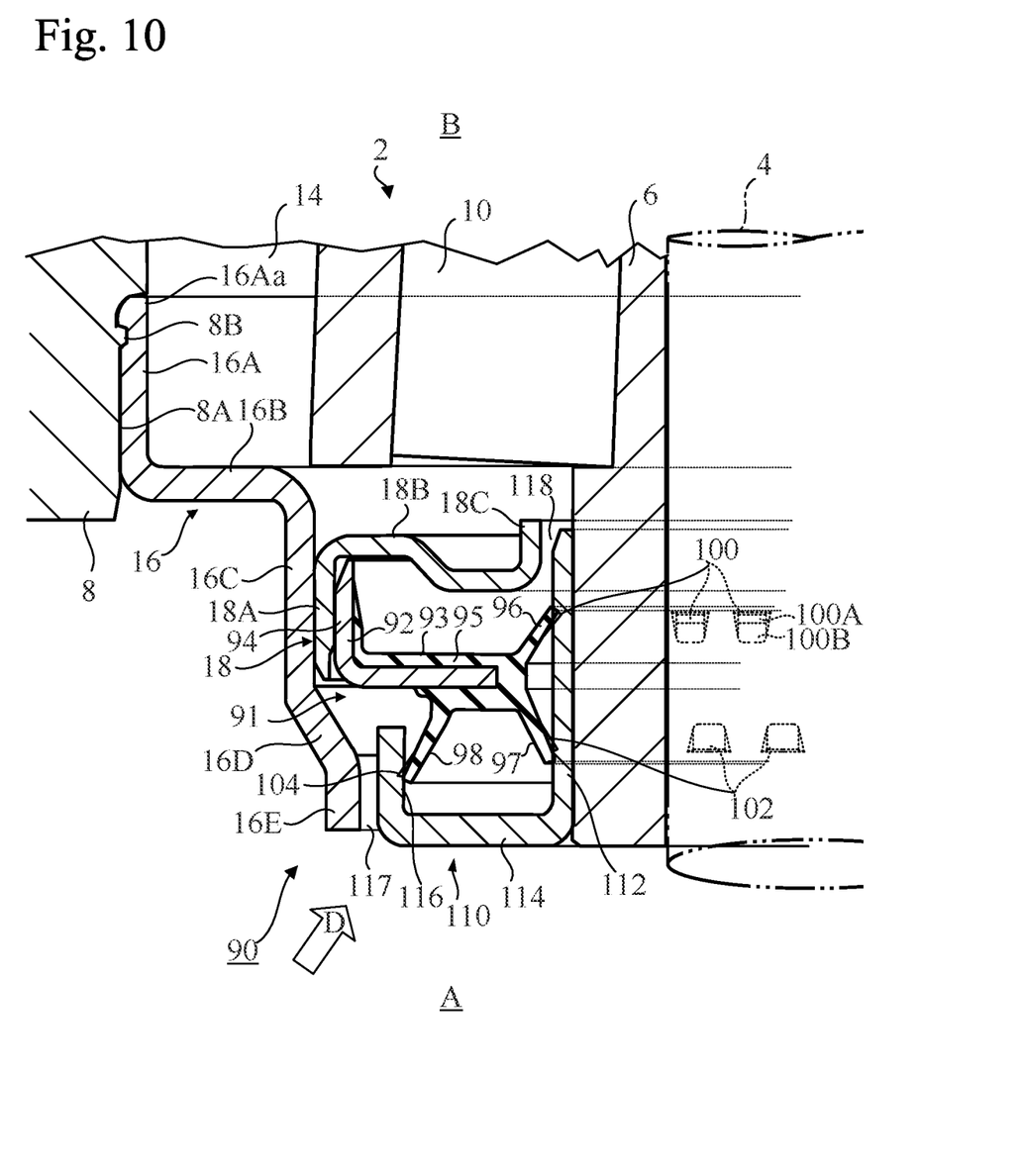
FIG. 10 is a cross-sectional view of a sealing device according to a third embodiment of the present invention.

FIG. 10 shows a sealing device 90 according to a third embodiment of the present invention.

The sealing device 90 is disposed between the inner race 6 and the outer race 8, which rotate relative to each other, and acts to seal the gap between the inner race 6 and the outer race 8. The sealing device 90 prevents or reduces the outflow of grease, i.e., lubricant, from the inside of the rolling bearing 2, and prevents or reduces the ingress of foreign matter from the outside to the inside of the rolling bearing 2. In FIG. 10, arrow D indicates an example of the flow direction of foreign matter from the outside.

In FIG. 10, only the left side with respect to the axle 4 is shown, but the sealing device 90 and the rolling bearing 2 have symmetric rotational shapes. The upper side of FIG. 10 is the bearing inner side B, and the lower side is the atmosphere side A. However, another sealing device similar to the sealing device 90 is provided on the opposite side of the rolling bearing 2 from the sealing device 90.

The sealing device 90 includes four annular sealing members, i.e., an outer sealing member 16, an intermediate sealing member 18, an inner sealing member 91, and a slinger 110.

The outer sealing member 16 and the intermediate sealing member 18 of this embodiment are almost the same as those in the first embodiment, except that the circular annular section 16D of the outer sealing member 16 of this embodiment is inclined and has a truncated cone shape.

The slinger 110 is formed from a rigid material such as a metal. The slinger 110 includes a sleeve 112, a flange 114, and an outer sleeve 116. The sleeve 112 is to be mounted to the inner race 6, by use of an interference fit method, for example. The flange 114 extends radially outward from the end on the atmosphere side of the sleeve 112. The outer sleeve 116 extends from the outer edge of the flange 114 to the bearing inner side B along the axial direction of the slinger 110.

An annular clearance 117 is provided between the outer sleeve 116 and the inner cylindrical section 16E of the outer sealing member 16, and another annular gap 118 is provided between the end of the bearing inner side B of the sleeve 112 and the inner cylindrical section 18C of the intermediate sealing member 18.

The inner sealing member 91 is arranged inside the outer sealing member 16 and the intermediate sealing member 18, and is disposed between the outer sealing member 16 and the slinger 110, which rotate relative to each other to seal the gap between the outer sealing member 16 and the slinger 110. Accordingly, the inner sealing member 91 can be considered as a sealing device.

The inner sealing member (sealing device) 91 has a composite structure that includes a rigid part 92 formed from a rigid material, for example, a metal, and an elastic part 93 formed from an elastic material, for example, an elastomer. The elastic part 93 is fixed to the rigid part 92 to reinforce the elastic part 93.

The inner sealing member 91 includes a mounted cylindrical section 94 that is to be mounted to the intermediate sealing member 18, a circular annular section 95, a seal lip (grease lip) 96, an auxiliary lip (dust lip) 97, and a side lip (dust lip) 98.

The mounted cylindrical section 94 has a rigid part 92 and an elastic part 93, and is fixed to the inner peripheral surface of the outer cylindrical section 18A of the intermediate sealing member 18 by an interference fit.

The circular annular section 95 has a rigid part 92 and an elastic part 93, and extends radially inward from the mounted cylindrical section 94.

The elastic part 93 includes lips 96, 97, and 98.

The seal lip 96 is a radial lip shaped as a truncated cone ring, and extends diagonally (radially inward and toward the bearing inner side B) from the inner end of the circular annular section 95. The seal lip 96 extends toward the outer peripheral surface of the sleeve 112 of the slinger 110, and the distal end of the seal lip 96 is in contact with the outer peripheral surface of the sleeve 112 so as to be slidable over the entire circumference. Primarily, the seal lip 96 acts to prevent or reduce leakage of the lubricant from the bearing inner side B to the atmosphere side A.

The auxiliary lip 97 is a radial lip shaped as a truncated cone ring, and extends diagonally (radially inward and toward the atmosphere side A) from the inner end of the circular annular section 95. The auxiliary lip 97 is located inside the outer sleeve 116 of the slinger 110, and extends to the outer peripheral surface of the sleeve 112 of the slinger 110. In this embodiment, the distal end of the auxiliary lip 97 is in contact with the outer peripheral surface of the sleeve 112 of the slinger 110 so as to be slidable over the entire circumference. Primarily, the auxiliary lip 97 acts to prevent or reduce ingress of foreign matter from the atmosphere side A to the bearing inner side B, and also acts to prevent or reduce leakage of the lubricant from the bearing inner side B to the atmosphere side A.

The side lip 98 is a radial lip shaped as a truncated cone ring, and extends diagonally (radially outward and toward the atmosphere side A) from the circular annular section 95. The side lip 98 is located inside the outer sleeve 116 of the slinger 110, and extends to the inner peripheral surface of the outer sleeve 116 of the slinger 110. In this embodiment, the distal end of the side lip 98 is in contact with the inner peripheral surface of the outer sleeve 116 of the slinger 110 so as to be slidable over the entire circumference. Primarily, the side lip 98 acts to prevent or reduce ingress of foreign matter from the atmosphere side A to the bearing inner side B, and also acts to prevent or reduce leakage of the lubricant from the bearing inner side B to the atmosphere side A.

In a manner similar to that of the bumps 36 formed on the seal lip 30 in the first embodiment, multiple bumps 100 are formed on the inner peripheral surface of the seal lip 96 in this embodiment. The bumps 100 are always in slidable contact with the outer peripheral surface of the sleeve 112 of the slinger 110. Thus, in the inner peripheral surface of the seal lip 96, there are provided clearances between the seal lip 96 and the sleeve 1122 in vicinities of the bumps 100, although parts that are distant from the bumps 100 are in contact with the outer peripheral surface of the sleeve 112.

As described above, the seal lip 96 slidably contacts the outer peripheral surface of the sleeve 112 and seals the lubricant inside the rolling bearing 2, resulting in a superior ability to seal lubricant. On the other hand, multiple bumps 100 formed on the inner peripheral surface of the seal lip 96 are always in slidable contact with the outer peripheral surface of the sleeve 112, and small clearances exist between the seal lip 96 and the outer peripheral surface of the sleeve 112. Air flows through the small clearances between the seal lip 96 and the outer peripheral surface of the sleeve 112, to/from the inside of the rolling bearing 2 (bearing inner side B) and from/to the outside of the rolling bearing 2 (atmosphere side A), thereby reducing a likelihood of heat generation even when the internal pressure in the rolling bearing 2 rises.

Similar to the bump 36 formed in the seal lip 30 of the first embodiment, each bump 100 preferably has a parallel surface 100A that is parallel to the inner peripheral surface of the seal lip 96, and an inclined surface 100B having a height gradually decreases from the parallel surface 100A toward the inner peripheral surface of the seal lip 96. In this case, it is easy to form each bump 100 such that it has a target height relative to the inner peripheral surface of the seal lip 96.

In addition, similar to the seal lip 30 of the first embodiment, minute convexities and concavities (not shown) are formed on the inner peripheral surface, which includes the bumps 100, of the seal lip 96. The ten point height of irregularities Rz of the inner peripheral surface of the seal lip 96 having minute convexities and concavities is preferably 15 μm or more and 30 μm or less.

In the inner sealing member 91 according to this embodiment, the distal end of the auxiliary lip 97 is in slidable contact with the outer peripheral surface of the sleeve 112 of the slinger 110. However, the distal end of the auxiliary lip 97 need not be in contact with the slinger 110, in which case, there will be an annular clearance between the distal end of the auxiliary lip 97 and the slinger 110. If the clearance is small, the auxiliary lip 97 can prevent or reduce ingress of foreign matter from the atmosphere side A to the bearing inner side B.

In addition, the distal end of the side lip 98 slidably contacts the inner peripheral surface of the outer sleeve 116 of the slinger 110, but the distal end of the side lip 98 need not contact the slinger 110. In this case, there will be an annular clearance between the distal end of the side lip 98 and the slinger 110, but if the clearance is small, the side lip 98 can prevent or reduce ingress of foreign matter from the atmosphere side A to the bearing inner side B.

In the embodiment in which the distal end of the auxiliary lip 97 slidably contacts the outer peripheral surface of the sleeve 112 of the slinger 110, multiple bumps 102 are also formed on the inner peripheral surface of the auxiliary lip 97. The bumps 102 are always in slidable contact with the outer peripheral surface of the sleeve 112 of the slinger 110. Thus, in the inner peripheral surface of the auxiliary lip 97, there are provided clearances between the auxiliary lip 97 and the cylindrical part 12A in vicinities of the bumps 102, although parts that are distant from the bumps 102 are in contact with the outer peripheral surface of the sleeve 112 of the slinger 110. Accordingly, whereas an ability of the auxiliary lip 97 to seal the lubricant is high, even if the pressure inside the rolling bearing 2 decreases, the auxiliary lip 97 is not strongly attracted to the outer peripheral surface of the sleeve 112, and the risk of heat generation is reduced.

In this embodiment, each bump 102 does not have a parallel surface corresponding to the parallel surface 100A of each bump 100, and has only a surface inclined relative to the inner peripheral surface of the auxiliary lip 97. However, each bump 102 may be placed at a position that abuts the distal edge of the auxiliary lip 97, and a parallel surface corresponding to the parallel surface 100A of each bump 100 may be provided on each bump 102. In this case, it is easy to form each bump 102 such that it has a target height relative to the inner peripheral surface of the auxiliary lip 97.

Similar to the inner peripheral surface of the seal lip 96, it is preferable that minute convexities and concavities be formed on the inner peripheral surface of the auxiliary lip 97 that includes the bumps 102. The ten point height of irregularities Rz of the inner peripheral surface of the auxiliary lip 97 having minute convexities and concavities is preferably 15 μm or more and 30 μm or less.

In the embodiment in which the distal end of the side lip 98 slidably contacts the inner peripheral surface of the outer sleeve 116 of the slinger 110, multiple bumps 104 are also formed on the outer peripheral surface of side lip 98. The bumps 104 are always in slidable contact with the inner peripheral surface of the outer sleeve 116 of the slinger 110. Thus, in the outer peripheral surface of the side lip 98, there are provided clearances between the side lip 98 and the outer sleeve 116 in vicinities of the bumps 104, although parts that are distant from the bumps 104 are in contact with the inner peripheral surface of the outer sleeve 116 of the slinger 110. Accordingly, whereas an ability of the side lip 98 to seal the lubricant is high, even if the pressure inside the rolling bearing 2 decreases, the side lip 98 is not strongly pressed against the inner peripheral surface of the outer sleeve 116, and the risk of heat generation is reduced.

In this embodiment, each bump 104 does not have a parallel surface corresponding to the parallel surface 36A of each bump 36, and has only a surface inclined relative to the outer peripheral surface of the side lip 98. However, each bump 104 may be placed at a position that abuts the distal edge of the side lip 98, and a parallel surface corresponding to the parallel surface 36A of each bump 36 may be provided on each bump 104. In this case, it is easy to form each bump 104 such that it has a target height relative to the outer peripheral surface of the side lip 98.

Similar to the inner peripheral surface of the seal lip 96, it is preferable that minute convexities and concavities be formed on the inner peripheral surface of the side lip 98 that includes the bumps 104. The ten point height of irregularities Rz of the inner peripheral surface of the side lip 98 having minute convexities and concavities is preferably 15 μm or more and 30 μm or less.

Other Modifications

Although the present invention has been described, the foregoing description is not intended to limit the present invention. Various modifications including one or more omissions, additions, and substitutions of structural elements may be made within the scope of the present invention.

For example, the shape and number of lips of the sealing device are not limited to those described above.

In the above embodiments, the inner race 6 and the oil stopping member 12, which are the inner members, are rotating members, and the outer race 8, which is the outer member, is a stationary member. However, the present invention is not limited to the above embodiments, and is applicable to sealing multiple members that rotate relative to each other. For example, the inner members may be stationary, and the outer member may rotate, or all of the members may rotate.

Aspects of the present invention are also set out in the following numbered clauses:

Clause 1. A sealing device disposed between an inner member and an outer member of a rolling bearing, which rotate relative to each other, for sealing a gap between the inner member and the outer member, the sealing device comprising:

an annular rigid part that is to be fixed to an inside of a hole of the outer member, the rigid part being made from a rigid material; and an elastic part fixed to the rigid part, the elastic part being made from an elastic material, the elastic part comprising a seal lip shaped as a truncated cone ring that is to be in slidable contact with the inner member or a member fixed to the inner member, multiple bumps being formed on an inner peripheral surface of the seal lip, the bumps always being in slidable contact with the inner member or the member fixed to the inner member, clearances being provided between the seal lip and the inner member or the member fixed to the inner member in vicinities of the bumps.

Clause 2. The sealing device according to clause 1, wherein each of the bumps comprises a parallel surface that is parallel to the inner peripheral surface of the seal lip, and an inclined surface continuing from the parallel surface, the inclined surface having a height that decreases from the parallel surface to the inner peripheral surface.

In this case, since each bump has a surface that is parallel to the inner peripheral surface of the seal lip, even if a cutting position deviates from a target position when the seal lip is finished together with the bumps after the seal lip with the bumps is shaped, e.g., by use of a mold, the height of the bumps (the distance between the parallel surface and the inner peripheral surface) will be the target height.

Clause 3. The sealing device according to clause 1 or 2, wherein convexities and concavities are formed on the inner peripheral surface of the seal lip.

In this case, minute convexities and concavities on the inner peripheral surface of the seal lip reduce frictional resistance of the seal lip and minimize heat generation and torque. In addition, the minute convexities and concavities of the inner peripheral surface of the seal lip create minute gaps between the seal lip and the inner member or the member fixed to the inner member. Air flows through the minute gaps to/from the inside of the bearing and from/to the outside of the bearing, so that the seal lip and/or another lip are not pressed against or attracted to the inner member or the member fixed to the inner member, thereby reducing a likelihood of heat generation due to an increase in friction even when the internal pressure in the bearing rises or falls.

Clause 4. The sealing device according to clause 3, wherein a ten point height of irregularities Rz of the inner peripheral surface is equal to or greater than 15 μm and is equal to or less than 30 μm.

In this case, the roughness of the inner peripheral surface with the minute convexities and concavities is sufficient, and therefore, sealing of the lubricant by the seal lip and air flow can both be achieved.

Clause 5. The sealing device according to any one of clauses 1 to 4, wherein the elastic part comprises a dust lip shaped as a truncated cone ring that is to be in slidable contact with the inner member or a member fixed to the inner member, convexities and concavities being formed on an inner peripheral surface of the dust lip.

In this case, minute convexities and concavities on the inner peripheral surface of the dust lip reduce frictional resistance of the dust lip and minimize heat generation and torque. In addition, the minute convexities and concavities of the inner peripheral surface of the dust lip create minute gaps between the dust lip and the inner member or the member fixed to the inner member. Air flows through the minute gaps to/from the inside of the bearing and from/to the outside of the bearing, so that the dust lip is not attracted to the inner member or the member fixed to the inner member, thereby reducing a likelihood of heat generation due to an increase in friction even when the internal pressure in the bearing rises or falls.

Clause 6. The sealing device according to clause 5, wherein a ten point height of irregularities Rz of the inner peripheral surface of the dust lip is equal to or greater than 15 μm and is equal to or less than 30 μm.

In this case, the roughness of the inner peripheral surface with the minute convexities and concavities is sufficient, and therefore, sealing of the lubricant by the dust lip and air flow can both be achieved.

REFERENCE SYMBOLS

1: Sealing device
2: Rolling bearing
4: Axle
6: Inner race (inner member)
8: Outer race (outer member)
8A: Hole
12: Oil stopping member (inner member)
16: Outer sealing member
18: Intermediate sealing member
20: Inner sealing member
20: Inner sealing member (sealing device)
22: Rigid part
24: Elastic part
26: Mounted cylindrical section
28: Circular annular section
30: Seal lip (grease lip)
32: Auxiliary lip (dust lip)
34: Side lip (dust lip)
36: Bump
36A: Parallel surface
36B: Inclined surface
38: Bump
40: Sealing device
41: Inner sealing member
50: Outer sealing member (sealing device)
52: Rigid part
54: Elastic part
55: Cylindrical section
56: Circular annular section
62: Seal lip (grease lip)
64: Dust lip (side lip)
84: Bump
84A: Parallel surface
84B: Inclined surface
90: Sealing device
91: Inner sealing member (sealing device)
92: Rigid part
93: Elastic part
94: Mounted cylindrical section
95: Circular annular section
96: Seal lip (grease lip)
97: Auxiliary lip (dust lip)
98: Side lip (dust lip)
100: Bump
100A: Parallel surface
100B: Inclined surface
102: Bump
104: Bump
110: Slinger

The invention claimed is:

1. A sealing device adapted to be disposed between an inner member and an outer member of a rolling bearing, which rotate relative to each other, for sealing a gap between the inner member and the outer member, the sealing device comprising:

an annular rigid part that is adapted to be fixed to an inside of a hole of the outer member, the rigid part made from a rigid material; and an elastic part fixed to the rigid part, the elastic part made from an elastic material, wherein the elastic part comprises a seal lip having an outer peripheral surface shaped in a truncated cone, an inner peripheral surface shaped in a truncated cone that is substantially parallel to the outer peripheral surface, a proximal end, and a distal end that is configured to be in slidable contact with an outer peripheral surface of a cylindrical part of the inner member or a member fixed to the inner member, wherein multiple bumps are formed on the inner peripheral surface of the seal lip, the multiple bumps being adapted to be always in slidable contact with the inner member or the member fixed to the inner member for providing clearances between the seal lip and the inner member or the member fixed to the inner member in vicinities the multiple bumps, and wherein each of the multiple bumps comprises a parallel surface that is parallel to the inner peripheral surface of the seal lip, and an inclined surface continuing from the parallel surface, the parallel surface and the inclined surface of each of the multiple bumps being aligned along a generatrix of the inner peripheral surface of the seal lip shaped in a truncated cone, the parallel surface being disposed at the distal end of the seal lip, the inclined surface being disposed at an intermediate portion between the proximal end and the distal end of the seal lip, and the inclined surface having a height that decreases from the parallel surface to the inner peripheral surface at the proximal end of the seal lip.

2. A sealing device disposed between an inner member and an outer member of a rolling bearing, which rotate relative to each other, for sealing a gap between the inner member and the outer member, the inner member or a member fixed to the inner member comprising a cylindrical part, a flange extending radially outward from the cylindrical part, and an outer cylindrical part connected to the flange, the sealing device comprising:

an annular rigid part that is adapted to be fixed to an inside of a hole of the outer member, the rigid part made from a rigid material; and an elastic part fixed to the rigid part, the elastic part made from an elastic material, the elastic part comprising:

a seal lip shaped in a truncated cone ring that is adapted to be in slidable contact with the cylindrical part of the inner member or the member fixed to the inner member, multiple bumps formed on an inner peripheral surface of the seal lip, the multiple bumps being adapted to be always in slidable contact with the cylindrical part of the inner member or the member fixed to the inner member for providing clearances between the seal lip and the cylindrical part of the inner member or the member fixed to the inner member in vicinities of the multiple bumps;

a dust lip shaped in a truncated cone ring that is adapted to be in slidable contact with the cylindrical part of the inner member or the member fixed to the inner member;

multiple second bumps formed on an inner peripheral surface of the dust lip, the multiple second bumps being adapted to be always in slidable contact with the cylindrical part of the inner member or the member fixed to the inner member for providing clearances between the dust lip and the cylindrical part in vicinities of the multiple second bumps;

a second dust lip shaped in a truncated cone ring and having an outer peripheral surface that is adapted to be in slidable contact with an inner peripheral surface of the outer cylindrical part of the inner member or the member fixed to the inner member, and multiple third bumps formed on the outer peripheral surface of the second dust lip, the multiple third bumps being adapted to be always in slidable contact with the inner peripheral surface of the outer cylindrical part for providing clearances between the second dust lip and the inner peripheral surface of the outer cylindrical part in vicinities of the multiple third bumps.

3. The sealing device according to claim 2, wherein convexities and concavities are formed on the inner peripheral surface of the seal lip.

4. The sealing device according to claim 3, wherein a ten point height of irregularities Rz of the inner peripheral surface of the seal lip is equal to or greater than 15 μm and is equal to or less than 30 μm.

5. The sealing device according to claim 2, wherein convexities and concavities are formed on an inner peripheral surface of the dust lip.

6. The sealing device according to claim 5, wherein a ten point height of irregularities Rz of the inner peripheral surface of the dust lip is equal to or greater than 15 μm and is equal to or less than 30 μm.

* * * * *